United States Patent

Gambogi, Jr. et al.

[11] Patent Number: 6,081,354
[45] Date of Patent: Jun. 27, 2000

[54] HOLOGRAPHIC REFLECTOR FOR LIQUID CRYSTAL DISPLAY

[75] Inventors: William John Gambogi, Jr., Wilmington; Torence John Trout, Yorklyn, both of Del.

[73] Assignee: E. I. du Pont de Nemours and Company, Wilmington, Del.

[21] Appl. No.: 09/079,465

[22] Filed: May 15, 1998

[51] Int. Cl.[7] .................................................. G02B 5/32
[52] U.S. Cl. ............................. 359/15; 359/25; 349/63; 349/108
[58] Field of Search ................................ 359/15, 22, 25; 349/63, 106, 108, 113

[56] References Cited

U.S. PATENT DOCUMENTS

| | | | |
|---|---|---|---|
| 5,182,180 | 1/1993 | Gambogi, Jr. et al. | 430/1 |
| 5,513,025 | 4/1996 | Watanabe et al. | 349/106 |
| 5,526,145 | 6/1996 | Weber | 359/15 |
| 5,537,232 | 7/1996 | Biles | 359/22 |
| 5,663,816 | 9/1997 | Chen et al. | 359/15 |
| 5,729,313 | 3/1998 | Mitsui | 359/15 |

OTHER PUBLICATIONS

M. Wenyon, W. Molteni P. Ralli, White Holographic Reflectors for LCDs, *The Society for Information Display 1997 Internation Symposium*, May 4, 1997.

Primary Examiner—Darren E. Schuberg
Attorney, Agent, or Firm—Thomas H. Magee

[57] ABSTRACT

A reflective liquid crystal display contains, a holographic reflector that provides either a white or more neutral background color to the display when viewed with ambient white light. The holographic reflector comprises a holographic recording film layer that includes at least first and second pixel volumes containing holographic mirrors and, preferably, third pixel volumes containing holographic mirrors.

3 Claims, 4 Drawing Sheets

HOLOGRAPHIC REFLECTOR FOR LIQUID CRYSTAL DISPLAY

BACKGROUND OF THE INVENTION

1. Field of the Invention

This invention pertains to a holographic reflector for providing a white and/or neutral background in a liquid crystal display apparatus.

2. Description of Related Art

Liquid crystal display (LCD) assemblies have many uses including displays in vehicle dashboards, watches, calculators, televisions, computers, video camera view finders, etc. Conventional reflective LCD assemblies with holographic reflectors are adapted to display images by reflecting light of a single color, which is usually green and results in the entire display area having a green color (except for imaged areas). An illustrative LCD assembly of this type is disclosed in U.S. Pat. No. 5,663,816. In the prior art reflective LCDs, the background displays are of a non-neutral color and have an increased tendency for eye fatigue and less visually appealing backgrounds.

It would be highly desirable to have efficient reflective LCD assemblies that would reflect either white light and/or light having a more neutral quality associated with it. The present invention provides an improved reflective LCD assembly that addresses this key need.

SUMMARY OF THE INVENTION

The invention pertains to a volume holographic reflector that is employed in a liquid crystal display apparatus to provide a white and/or neutral background for the display when viewed with ambient light. The liquid crystal display apparatus includes a liquid crystal display element having a layer of liquid crystals contained in a plurality of cells capable of providing a particular orientation for the liquid crystals therein, and includes a holographic reflector adjacent the liquid crystal display element. The holographic reflector is a holographic recording film layer containing a plurality of first pixel volumes and a plurality of second pixel volumes. Each one of the first pixel volumes includes a first volume holographic mirror that reflects only light with a first color (e.g., Red) wavelength band. Each one of the second pixel volumes includes a second volume holographic mirror that reflects only light with a second color (e.g., Green) wavelength band. The first and second pixel volumes are positioned in the recording film layer such that light passing through each liquid crystal cell is reflected from both a first pixel volume and a second pixel volume. In this embodiment of the liquid crystal display apparatus, the holographic reflector imparts a yellow background color to the display. Specifically, for this embodiment, in operation the images on the display appear black and are on a yellow background.

In a preferred embodiment of this invention, the recording film layer of the liquid crystal display apparatus further contains a plurality of third pixel volumes. Each one of the third pixel volumes includes a third volume holographic mirror that reflects only light with a third color (e.g., blue) wavelength band. The third pixel volumes are positioned in the recording film layer such that light passing through each liquid crystal cell is also reflected from a third pixel volume. In this embodiment of the liquid crystal display apparatus, the holographic reflector imparts a white background color to the display. Specifically, for this embodiment, in operation the images on the display appear to an observer to be black on a white background. Hence, the holographic reflector of this embodiment is termed a white holographic reflector.

DETAILED DESCRIPTION OF THE INVENTION

Figure 1:
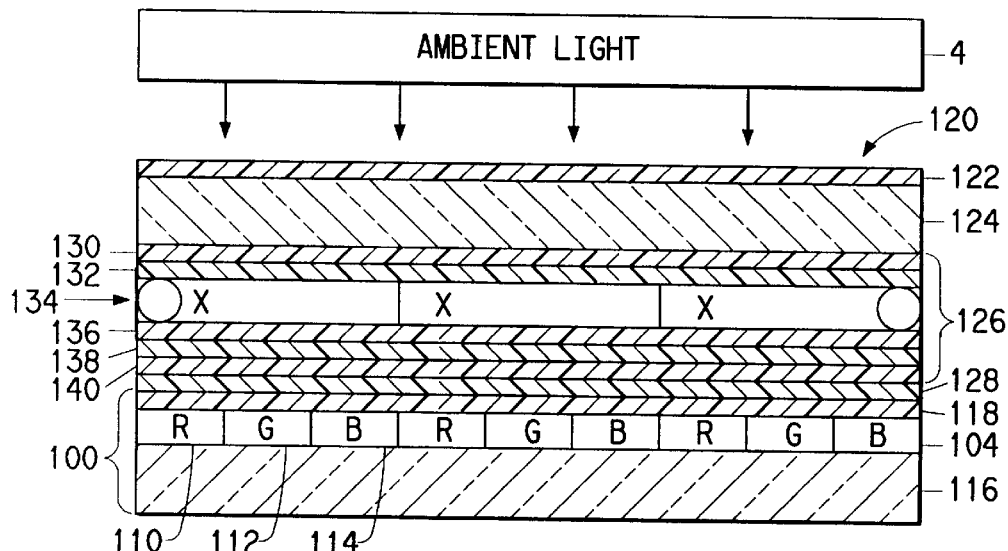
FIG. 1 illustrates a reflective liquid crystal display apparatus which includes a volume holographic optical element and a liquid crystal display element.

FIG. 1 illustrates a preferred embodiment of a reflective liquid crystal display apparatus 120 of this invention. The liquid crystal display apparatus 120 includes a volume holographic optical element 100 and a liquid crystal display element 126. An essential portion of the reflective liquid crystal display apparatus of this invention is the relationship of the volume holographic optical element 100 to an array of cells X of the liquid crystal layer of the liquid crystal element 126. In FIG. 1 for a preferred embodiment, it is shown that each cell X of the liquid crystal layer 134 has aligned with it in layer 104 one first pixel volume 110, one second pixel volume 112, and one third pixel volume 114. This is a minimum requirement, and there can be greater than one first, second, and third pixel volumes 110, 112, and 114 in alignment with a given cell X in the multilayer improved reflective LCD apparatus of this invention. There is no upper limit to the number of first, second, and third pixel volumes 110, 112, and 114 in alignment with a given cell X.

In order to achieve a white or approximately neutral background in this invention, it is critical that the numbers of first, second, and third pixel volumes 110, 112, and 114 in alignment with a given cell X be approximately equal to each other within plus or minus 30%. Preferably, the numbers of first, second, and third pixel volumes 110, 112, and 114 in alignment with a given cell X are approximately equal to each other within plus or minus 20%. Most preferably, the numbers of first, second, and third pixel volumes 110, 112, and 114 in alignment with a given cell X are either equal to each other or are approximately equal to each other within plus or minus 10%, which with appropriate sizing of the pixel volumes will afford a white or whitish background.

The size of the first, second, and third pixel volumes 110, 112, and 114 is another critical feature of this invention. The size of each first, second, and third pixel volumes 110, 112, and 114 according to this invention must be at or below a certain maximum size that relates to the maximum dot size of dots in arrays of adjacent red, green, and blue dots that the human eye will perceive as being colored white instead of being perceived as separate and discrete colored dots of red, green, and blue. This maximum size for pixel volumes that have circular geometry is conveniently measured in terms of the maximum dot diameter. Arrays of red, green, and blue dots that have diameters approximately at or below the maximum dot diameter will be perceived by the human eye as having a white color. Arrays of red, green, and blue dots that have diameters approximately at or above the maximum dot diameter will be perceived by the human eye as having separate red, green, or blue colors, respectively. Broadly speaking, taking into account individual differences in perception among humans, the maximum dot diameter in many instances is within a range from about 10 microns to about 100 microns, and in the majority of cases is approximately 20 microns. In some instances, the maximum dot diameter may be as high as approximately 500 microns. Accordingly the maximum size for pixel volumes that have circular geometry according to this invention is broadly less than 500 microns in diameter to encompass all embodiments. For many embodiments, the size for pixel volumes that have circular geometry according to this invention is less than 200 microns in diameter. Preferably in this invention, the size for pixel volumes having circular geometry is for the diameter to be within the range of about 1 micron to about 100 microns. More preferably, the size for pixel volumes having circular geometry is for the diameter to be within the range of about 5 microns to about 50 microns. Still more preferably, the size for pixel volumes having circular geometry is for the diameter to be within the range of about 10 microns to about 40 microns. Most preferably, the size for pixel volumes having circular geometry is for the diameter to be within the range of about 10 microns to about 30 microns. If the pixel volumes are other than circular, each dimension of a given non-circular pixel volume must be less than the maximum dot diameters as delineated above with the same ranges for preferences.

In another embodiment of this invention, there are present in layer 104 first pixel volumes 110 and second pixel volumes 112, but not third pixel volumes 114. Except for the absence of third pixel volumes 114 in this embodiment, all that was stated supra for the preferred embodiment also applies to this embodiment. The first pixel volumes 110 and second pixel volumes 112 can be any color combination of red, green, and blue, as long as the two colors are different, in this embodiment. In a preferred mode of this embodiment, the colors are red and green for the first pixel volumes 110 and second pixel volumes 112.

An important aspect of this invention is the high efficiency with which each of the holographic mirrors (e.g., first volume, second volume, and third volume) operate. In any given portion of the holographic recording film layer, there is only one holographic mirror, which can utilize in principle the full amount of refractive index modulation that is available and consequently can operate at high efficiency. When this high efficiency for each individual mirror is cumulatively totaled, the overall effect is a bright holographic image that is produced. Thus a white hologram can be produced in a single holographic layer using a straightforward production process.

The volume holographic optical element 100 comprises a single holographic recording film layer 104. The holographic recording film layer 104 comprises a first plurality of pixel volumes 110, a second plurality of pixel volumes 112, and a third plurality of pixel volumes 114.

Each one of the first pixel volumes 110 includes a first volume holographic mirror that reflects light with a first color (e.g., Red) wavelength band and passes light with at least a second color (e.g., Green) wavelength band and a third color (e.g., Blue) wavelength band. Each one of the second pixel volumes 112 includes a second volume holographic mirror that reflects light with the second color (e.g., Green) wavelength band and passes light with at least the first color (e.g., Red) wavelength band and the third color (e.g., Blue) wavelength band. Each one of the third pixel volumes 114 includes a third volume holographic mirror that reflects light with the third color (e.g., Blue) wavelength band and passes light with at least the first color (e.g., Red) wavelength band and the second color (e.g., Green) wavelength band.

Specifically, as illustrated in FIG. 1, the reflective liquid crystal display apparatus 120 comprises, in order, a first light polarizer 122, a top or first dimensionally stable support 124, a liquid crystal display element 126, a second light polarizer 128, and the volume holographic optical element 100. The first light polarizer 122 is for linearly polarizing and passing light, such as ambient light, having a first linear polarization. The top dimensionally stable substrate 124 provides rigidity and overall structural support. The liquid crystal display element 126 is well known by those skilled in the art and is for selectively modifying the polarization of the light passing through an array of cells X such that the polarization of light passing through the array of cells X can be and is changed to a second linear polarization but only when the cells X are powered on. Illustrative liquid crystal display elements are disclosed in the publications cited in the Background of the Invention section of this specification. The second polarization is typically perpendicular to the first polarization. The liquid crystal display element 126 can comprise, in order, a first circuitry layer 130, a first alignment layer 132, a liquid crystal layer 134, a second alignment layer 136, a second circuitry layer 1.38, and a leveling layer 140.

The circuitry layer 130 provides a first side of an electrical drive circuit capable of modifying a particular first side orientation of liquid crystals in the liquid crystal layer 134 through the first alignment layer 132. The liquid crystal layer 134 confines liquid crystals in cells corresponding to each pixel volume in the reflective filter 100. The second alignment layer 136 introduces a particular second side orientation to the liquid crystals in the liquid crystal layer 134. The second circuitry layer 138 provides a second side of the electrical drive circuit capable of modifying the particular second side orientation of liquid crystals in the liquid crystal layer 134 through the second alignment layer 136. The leveling layer 140 provides a rigid planar surface for the filter 100. The second light polarizer is for passing light from the liquid crystal display element 126 having the second polarization.

The holographic optical element 100 is comprised of an optional barrier layer 118, the first holographic film layer 104, and an optionally dimensionally stable substrate 116.

In operation, when the liquid crystal display element 126 modifies or rotates the polarization of the light passing through each cell of the array of cells X to the second polarization (which occurs when the cell is powered on), the light passes through the second polarizer 128 into the first pixel volumes 110, second pixel volumes 112 and third pixel volumes 114 in which, respectively, the first volume holographic mirror(s) reflects light with the first color (e.g., Red) wavelength band,, the second volume holographic mirror(s) reflects light with the second color (e.g., Green), and the third volume holographic mirror(s) reflects light with the third color (e.g., Blue) back through the liquid crystal display element 126 to a viewer on the same side of the LCD apparatus that ambient light 4 enters the first polarizer 122. Since, as depicted in FIG. 1, there is at least one pixel volume of each type (i.e., 110, 112, and 114) associated with each cell of the array of cells X, the result is that the light reflected back to the viewer from each cell of the display powered on contains Red, Green, and Blue components in the preferred mode depicted in FIG. 1. Since the maximum size of the pixel volumes is limited in this invention to less than about 500 microns and in preferred embodiments is in the range of 1–100 microns, as described below, the reflected light will appear white or substantially white to an observer as background color.

In all three cases, other wavelengths of light pass through the filter 100 away from the viewer. Further, light which passes through the liquid crystal display element 126 towards the second polarizer 128, but was not changed by the liquid crystal display element 126 to have the second polarization, is absorbed by the second polarizer 128. For a given cell, light will not be changed by the liquid crystal display element 126 if the cell is not powered (i.e. turned off). Since in this case light is absorbed by the second polarizer 128, the light does not reach the holographic reflector 100 and is not reflected back toward the viewer. Consequently, in this case, the cell will appear dark (e.g., black). If selected cells are powered off while the majority are powered on in the liquid crystal display device of this invention, the appearance of the display to an observer will be black on a white background. In this manner, images are created on the liquid crystal display apparatus of this invention.

Figure 2:
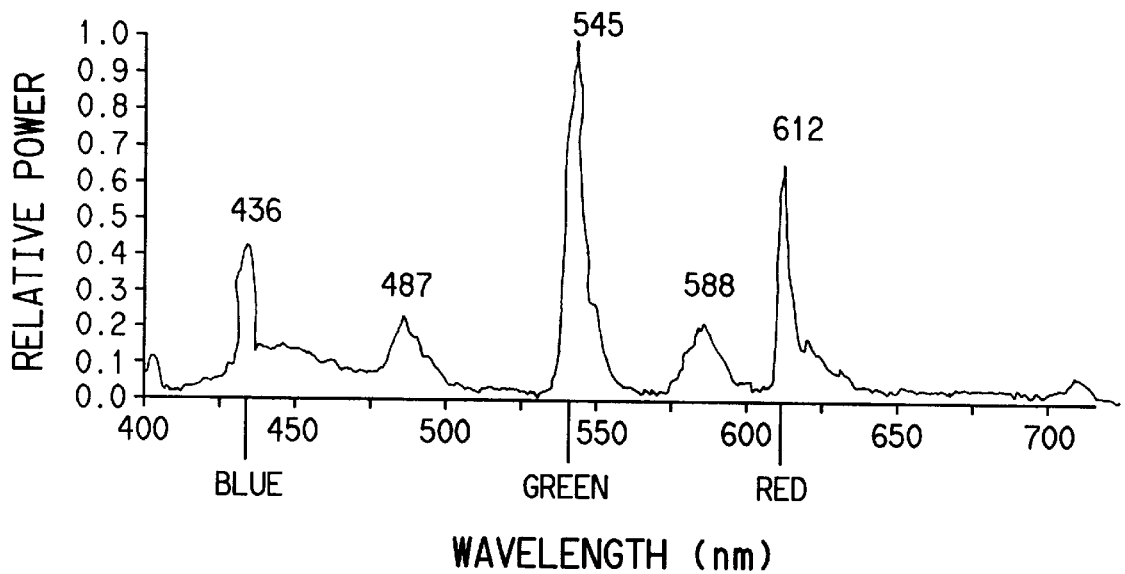
FIG. 2 is a graph of relative spectral power versus wavelength for a typical liquid crystal display light source.

An improved liquid crystal display apparatus according to this invention may have a display that is viewed with ambient light alone (as a reflective LCD) or it may have a display that is viewed with ambient light in combination with a backlight. In case of the latter, it is important to choose the wavelength bands for the first, second, and third pixel volumes to not substantially overlap with the major bands for light emitted from a typical backlight source as shown if FIG. 2. If light from the backlight source does fall in the same wavelength as a given holographic mirror (e.g., first, second, or third pixel volume), then it will be reflected and not transmitted through the holographic recording film layer 102 and hence light of this wavelength band will not reach the display.

Holographic Optical Element 100

Figure 6:
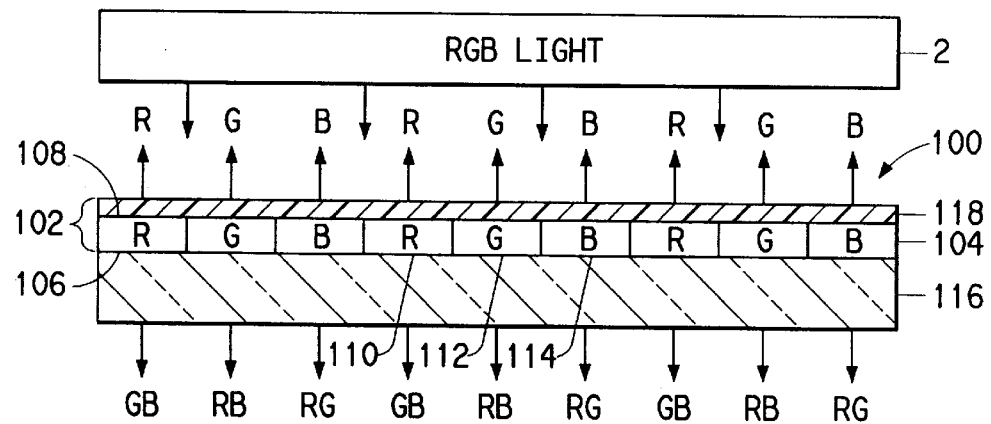
FIG. 6 illustrates a volume holographic optical element reflecting light from a light source in accordance with the present invention.

Referring to FIG. 6, there is illustrated a volume holographic optical element 100 in accordance with the present invention. The volume holographic optical element 100 comprises a photohardened holographic recording film element 102. In this embodiment, the photohardened holographic recording film element 102 comprises a single holographic recording film layer 104 having a surface 106 and a second surface 108. The holographic recording film layer 104 comprises a first plurality of pixel volumes 110 a second plurality of pixel volumes 112, and a third plurality of pixel volumes 114.

Each one of the first pixel volumes 110 includes a first volume holographic mirror that reflects light with a first color (e.g., Red) wavelength band and passes light with at least a second color (e.g., Green) wavelength band and a third color (e.g., Blue) wavelength band. Each one of the second pixel volumes 112 includes a second volume holographic mirror that reflects light with the second color (e.g., Green) wavelength band and passes light with at least the first color (e.g., Red) wavelength band and the third, color (e.g., Blue) wavelength band. Each one of the third pixel volumes 114 includes a third volume holographic mirror that reflects light with the third color (e.g., Blue) wavelength band and passes light with at least the first color (e.g., Red) wavelength band and the second color (e.g., Green) wavelength band.

The holographic mirrors are formed by fringes or gratings. The gratings of all holographic mirrors disclosed herein can be of any shape or slant achieved by conventional holographic methods. The gratings can be conformal gratings which are parallel to the surfaces 106,108 of the recording medium and/or non-conformal gratings which are non-parallel to the surfaces 106,108.

The operation or function of the volume holographic optical element 100 is illustrated in FIG. 6. Specifically, a light source 2 is illustrated providing light towards the photohardened holographic recording film element 100. The light source 2 can emit the first color (e.g., Red) wavelength band, the second color (e.g., Green) wavelength band and/or the third color (e.g., Blue) wavelength band. The light source 2 can emit coherent, substantially coherent or noncoherent light. The letters in FIG. 6 designating the color wavelength bands and the associated arrows illustrate whether the element 100 will pass or reflect the specific color wavelength band assuming that the light source 2 emits actinic radiation in such color wavelength band. Preferably, if the light source 2 also emits other color wavelength bands, such wavelength bands would also pass through the volume holographic optical element 100. The first volume holographic optical element 100 functions the same regardless of which side of the volume holographic optical element 100 the light source 2 is positioned.

The first color wavelength band, the second color wavelength band and the third color wavelength band can be any distinct wavelength bands of light. Preferably, the distinct wavelength bands are separated by other wavelength bands. Preferably, light having the first color wavelength band has a bandwidth of at least 5 (and more preferably within about 20–60) nanometers and includes a wavelength of 612 nanometers which appears Red. Preferably, light having the second color wavelength band has a bandwidth of at least 5 (and more preferably within about 20–60) nanometers and includes a wavelength of 545 nanometers which appears Green. Preferably, light having the third color wavelength band has a bandwidth of at least 5 (and more preferably within about 20–60) nanometers and includes a wavelength of 436 nanometers which appears Blue. Unless otherwise indicated, the letters in all pixel volumes throughout the Figures illustrate the color wavelength band(s) that is/are reflected by the pixel volume and all other color wavelengths pass through the pixel volumes. The letter "R" represents a Red wavelength band as an illustration for the first color wavelength band. The letter "G" represents a Green wavelength band as an illustration for the second color wavelength band. The letter "B" represents a Blue wavelength band as an illustration for the third color wavelength band. When two or more of these letters are listed together, it refers to light consisting essentially of the wavelength bands of each of the listed letters.

The first pixel volumes 110, the second pixel volumes 112 and the third pixel volumes 114 can be any shape in the film layer 104. A preferred shape is circular (e.g., dots). The volumes 110,112,114 do have sides which are part of the first and second surfaces 106,108 of the film layer 104. FIG. 6 depicts one row of a two dimensional array of the volumes 110,112,114 in a preferred embodiment for a white holographic reflector. In this invention, the pixels volumes 110,112,114 are ordered in each row of the array in a repeating sequence of one of the first pixel volumes 110, then one of the second pixel volumes 112 and then one of the third pixel volumes 114. The pixel volumes 110,112,114 in adjacent rows can be offset with respect to one another. In a less preferred embodiment having first and second pixel volumes, but not third pixel volumes, the pixel volumes 110 and 112 are ordered in each row of the array in a repeating sequence of one of the first pixel volumes 110 and then one of the second pixel volumes. The pixel volumes 110 and 112 in adjacent rows can be offset with respect to one another.

The size of the pixel volumes 110, 112, and 114 (optional, if present) is critical in this invention as discussed supra. If the pixel volumes are larger than a certain critical size, they will appear to an observer as having distinct colors (i.e., red, green, and blue for pixel volumes 110, 112, and 114, respectively). On the other hand, if the pixel volumes are smaller than the critical size, they will appear as a white background to an observer and not as having distinct color or shape.

In preferred embodiments, each of the pixel volumes 110, 112, and 114 is circular in shape and has a diameter within the range of about 1 micron to about 100 microns.

Also significant in this invention is the size of the pixel volumes 110, 112, and 114 with respect to each other. Broadly, within the scope of this invention, the size of each pixel volume type (e.g., first, 110) has the same approximate size of the other pixel volume types (e.g., second, 112 and third, 114) within plus or minus 40%, preferably within plus or minus 30%, more preferably within plus or minus 20%, and most preferably within plus or minus 10%.

The holographic optical element 100 further optionally comprises a dimensionally stable substrate 116 having a planar surface supporting the first surface 106 of the film layer 104. The holographic recording film element 102 may further comprise a barrier layer 118 on the second surface 108 of the film layer 104.

Method for Making Element 100

Figure 3:
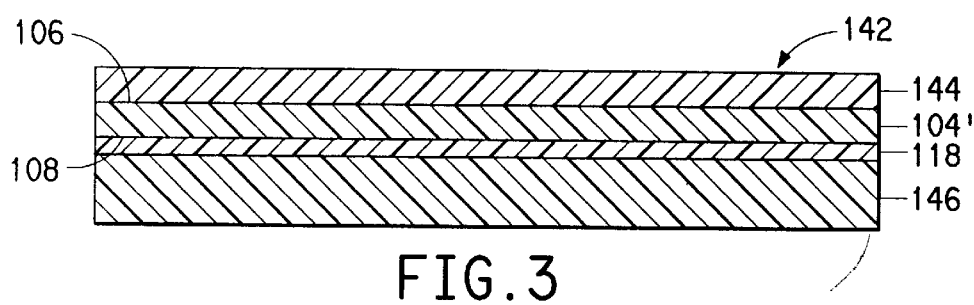
FIG. 3 illustrates a first photohardenable holographic recording film element.

FIG. 3 depicts a holographic recording film element 142 which can be used in making the photohardened holographic recording film element 100. The holographic recording film element 142 comprises, in turn, a cover sheet 144, an unimaged, unexposed holographic recording film layer 104', the barrier layer 118 and a dimensionally stable support 146.

A method for making the volume holographic optical element 100 will now be described starting with the first unimaged, unexposed holographic film element 142. The cover sheet 144 is removed from the first surface 106 of the holographic film layer 104'. The first surface 106 of the film layer 104' is laminated on the dimensionally stable substrate 116. The support 146 is removed from the barrier layer 118. An anti-reflection plate 148 with a photomask layer 150 is coupled through a first index matching fluid layer 152 to the barrier layer 118.

Figure 4:
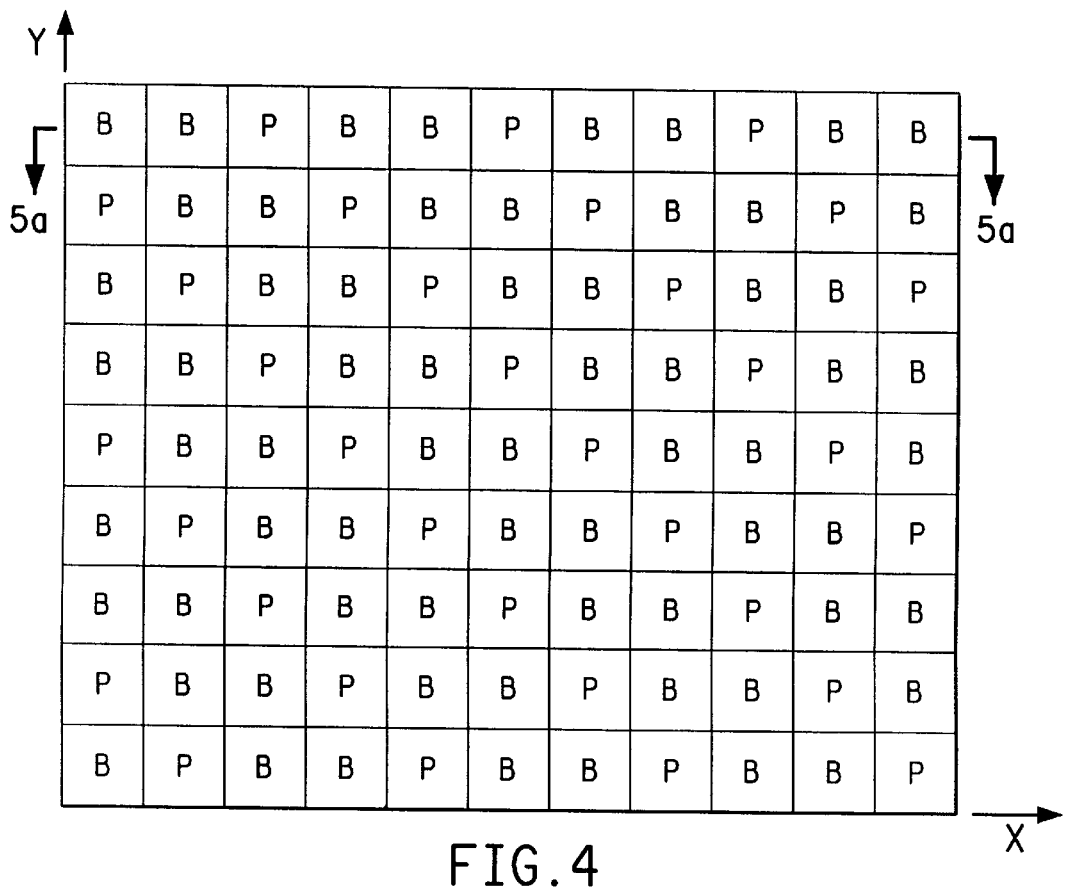
FIG. 4 shows a photomask that can be used in making the volume holographic optical element.

FIG. 4 shows a pattern that can be used for the photomask layer 150. The pattern is a two dimensional array of pixels having a first plurality of pixels B adapted to block light, and a second plurality of pixels P adapted to transmit or pass light. As shown in FIG. 4, the array of pixels can have a repeating pattern of the following three rows of pixels:

|     |   | Column |   |   |   |   |   |   |   |   |   |    |     |
|-----|---|--------|---|---|---|---|---|---|---|---|---|----|-----|
|     |   | 1      | 2 | 3 | 4 | 5 | 6 | 7 | 8 | 9 | 10 | 11 | ... |
| Row | 1 | B      | B | P | B | B | P | B | B | P | B  | B  | ... |
|     | 2 | P      | B | B | P | B | B | P | B | B | P  | B  | ... |
|     | 3 | B      | P | B | B | P | B | B | P | B | B  | P  | ... |

Figure 5A:
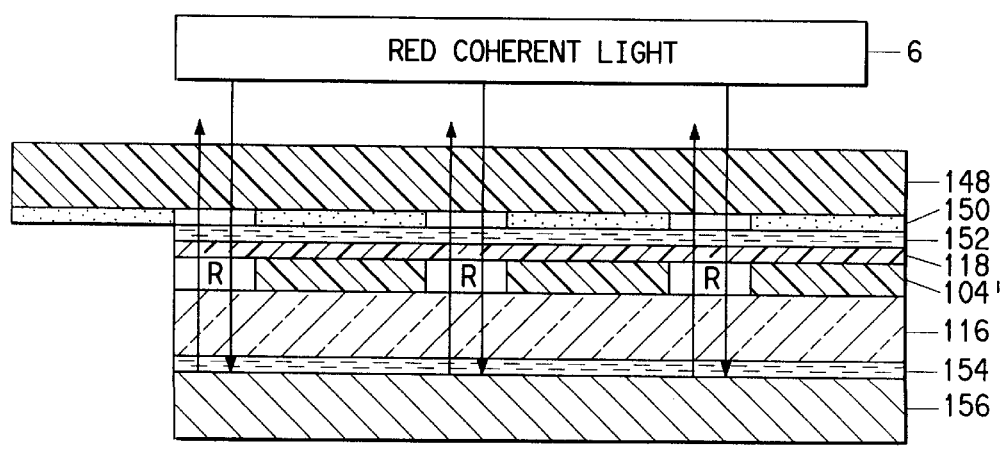
FIG. 5*a* illustrates holographically imaging a film element to record a plurality of first holographic mirrors in the film element.

The glass substrate 116 is coupled through a second index matching fluid layer 154 to a reflector 156, such as a front surface mirror. This results in a laminate structure which is depicted in FIG. 5a.

Next, a first color (e.g., Red) light source 6 is selected adapted to emit coherent or substantially coherent light consisting essentially of the first color (e.g., Red) wavelength band. Light from the first color (e.g., Red) light source 6 is directed, in turn., through the anti-reflection plate 148, the transparent pixels P of the photomask layer 150, and the holographic film layer 104' onto the reflector 156. The reflector 156 reflects the light back through the first holographic film layer 104' such that the reflected light interferes with the light passing through the film layer 104' towards the reflector 156. This interference holographically images or imagewise holographically exposes the holographic film layer 104' to record a plurality of the first volume holographic mirrors, one in each of the first pixel volumes 110.

Next the anti-reflection plate 148 and photomask layer 150 are shifted or moved one pixel in a first direction, i.e., in the X direction illustrated in FIG. 4.

Figure 5B:
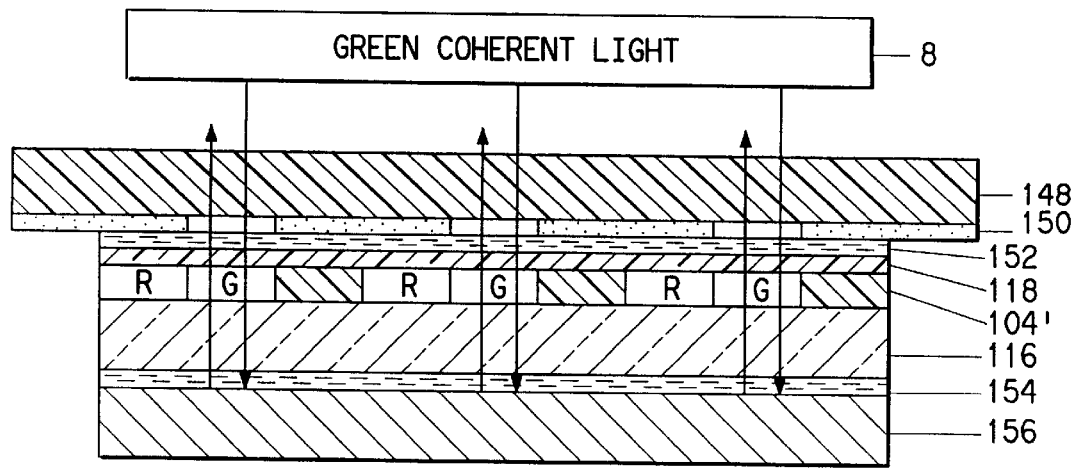
FIG. 5*b* illustrates holographically imaging the film element to record a plurality of second holographic mirrors in the film element.

Next, as illustrated in FIG. 5b, a second color (e.g., Green) light source 8 is selected adapted to emit coherent or substantially coherent light consisting essentially of the second color (e.g., Green) wavelength band. Light from the second color (e.g., Green) light source 8 is directed, in turn, through the anti-reflection plate 148, the transparent pixels P of the photomask layer 150, and the holographic film layer 104' onto the reflector 156. The reflector 156 reflects the light back through the holographic film layer 104' such that the reflected light interferes with the light passing through the film layer 104' towards the reflector 156. This interference holographically images or imagewise holographically exposes the holographic film layer 104' to record a plurality of the second volume holographic mirrors, one in each of the second pixel volumes 112.

Next the anti-reflection plate 148 and the photomask layer 150 are again shifted or moved one pixel in the first or X direction.

Figure 5C:
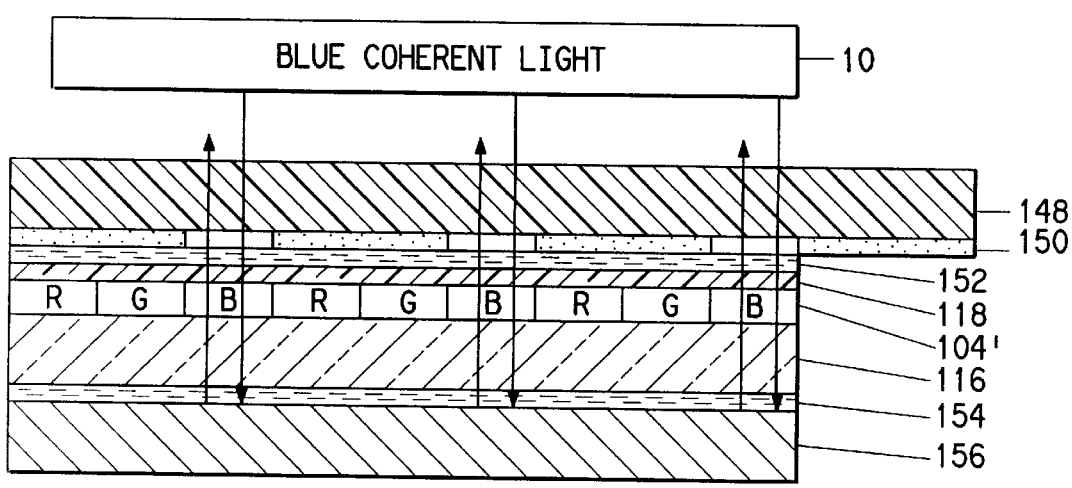
FIG. 5*c* illustrates holographically imaging the film element to record a plurality of third holographic mirrors in the film element.

Next, as illustrated in FIG. 5c, a third color (e.g., Blue) light source 10 is selected adapted to emit coherent or substantially coherent light consisting essentially of the third color (e.g., Blue) wavelength band. Light from the third color (e.g., Blue) light source 10 is directed, in turn, through the anti-reflection plate 148, the transparent pixels P of the photomask layer 150, and the first holographic film layer 104' onto the reflector 156. The reflector 156 reflects the light back through the film layer 104' such that the reflected light interferes with the light passing through the film layer 104' towards the reflector 156. This interference holographically images or imagewise holographically exposes the film layer 104' to record a plurality of the third volume holographic mirrors, one in each of the third pixel volumes 114. This third consecutive holographic imaging step completes the formation of the unimaged film layer 104' into the imaged film layer 104.

Figure 5D:
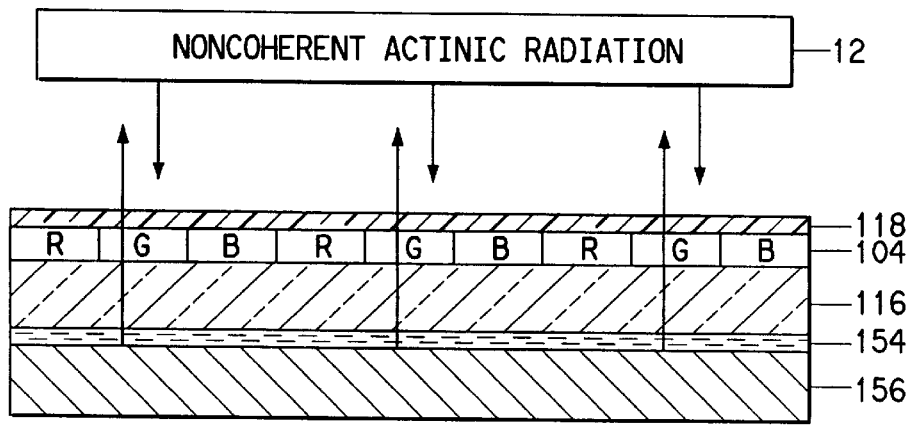
FIG. 5*d* illustrates curing the holographic recording film element.

After the anti-reflection plate 148, the photomask layer 150 and the first index matching fluid layer 152 are removed, the resulting laminate structure can be optionally cured, fixed or exposed to substantially polymerize any monomer and fix the holographic mirrors in the laminate structure. This can be accomplished, as illustrated in FIG. 5d, by using noncoherent actinic radiation, such as from a broad band ultraviolet light source 12, to flood expose the laminate structure. Throughout this application, the term "broad band ultraviolet light" means light in the spectral region of about 300 through 450 nanometers. This step provides an exposure level of about 100 millijoules per squared centimeter (mJ/cm$^2$), but the exposure level can be greater. This step typically occurs for about 20 seconds, but can occur longer. This step photohardens or substantially photohardens any remaining photosensitive material in the imaged film layer 104.

Figure 5E:
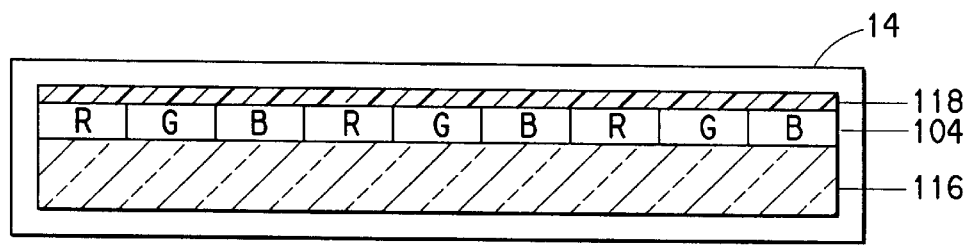
FIG. 5*e* illustrates heating the holographic recording film element.

After the reflector 156 and the second index matching fluid layer 154 are then removed, the resulting laminate structure can be optionally heated in an oven 14 such as illustrated in FIG. 5e. The structure is heated to further harden it and increase its refractive index modulation, its efficiency and the bandwidth of the holographic mirrors. This heating step occurs at a temperature in the range of about 50° C. through 200° C., and preferably in the range of about 100° C. through 160° C. The greater the temperature the shorter the duration of the heating step. Using the preferred materials, the holographic recording film element can be heated at about 100° C. for about 30 minutes.

This results in the first volume holographic optical element 100 illustrated in FIGS. 1 and 6 where the unimaged, unexposed holographic recording film layer 104' has become the holographic recording film layer 104 holographically imaged with mirrors, optionally fixed (flood exposed) and optionally cured.

Materials and/or Commercial Availability

The dimensionally stable substrate 116 can be made of a rigid transparent material and preferably is made of glass or plastic.

The barrier layer 118 is optional and is useful to prevent interlayer diffusion of dye sensitizer. When used, it is required to be transparent if irradiation is to be carried out through it. Such a barrier layer can be made of transparent polymer(s) and is preferably made of polyvinyl alcohol (PVA).

The cover sheet 144 functions to protect the film layer until ready for use. The cover sheet generally is a polymer film, such as polyethylene, polypropylene, or polyethylene terephthalate.

The unimaged, unexposed holographic Film layer 104' is made of a photohardenable or photosensitive material. Holograms are recorded in materials, such as holographic film layer 104', that produce a spatial pattern of varying refractive index, rather than optical density, when exposed to light. Holographic recording materials are described in a number of references, such as, L. Solymer and D. J. Cook, Volume Holography and Volume Gratings, Academic Press, New York, 1981, Chapter 10, pages 254–304; and W. K. Smothers, B. M. Monroe, A. M. Weber and D. E. Keys, Photopolymers for Holography, SPIE Vol. 1212, Practical Holography IV (1990). Early developments in holography are described by E. N. Leith and J. Upatnieks, Scientific American, 212(6), 24–35 (June 1965). A useful discussion of holography is presented By C. C. Guest entitled Holography in Encyclopedia of Physical Science and Technology, Vol. 6, pages 507–519, R. A. Myers, Ed., Academic Press, Orlando, Fla., 1987. Preferred recording materials for use in this invention are photopolymerizable compositions, dichromated gelatin, and silver halide emulsions.

Photopolymerizable compositions are disclosed in Haugh, U.S. Pat. No. 3,658,526; Chandross, U.S. Pat. No. 3,993,485; Tad Fielding, U.S. Pat. Nos. 4,535,041 and 4,588,664. Preferred photopolymerizable compositions are disclosed in Keys, U.S. Pat. No. 4,942,102; Monroe, U.S. Pat. No. 4,942,112; Smothers, U.S. Pat. No. 4,959,284; Trout, U.S. Pat. No. 4,963,471; Smothers, U.S. Pat. No. 5,236,808; Smothers, U.S. Pat. No. 5,256,520; Beresniewicz, et al. U.S. Pat. No. 5,413,863; and Weber et al., U.S. Pat. No. 5,470,662. The compositions used in the preferred recording film element are dry films.

As used throughout this specification, "fully sensitized" means that the material is photosensitive to light from about 400 to about 700 nanometers wavelengths which includes the entire visible range of light. See U.S. Pat. No. 4,917,977 which discloses methods for making fully sensitized, and non-fully sensitized or wavelength selectively sensitized, holographic materials. In addition, see the following related and more recent patents disclosing use of photosensitizers: Smothers, U.S. Pat. No. 5,204,467; Smothers, U.S. Pat. No. 5,236,808; and Smothers, U.S. Pat. No. 5,256,520.

The dimensionally stable support 146 is required to be transparent if irradiation is to be carried out through the support. Preferred materials for the support 146 are polymer films, such as polyethylene, polypropylene, cellulose, and polyethylene terephthalate.

Antireflection plates 148 which function to prevent back reflection of imaging light and reflectors 156 which function to reflect imaging light are commercially available from CVI Laser Corporation with offices at Albuquerque, New Mexico.

The photomask layer 150 functions to block all light from passing through the layers and can be made of patterned chromium or silver halide on glass. Alternatively, imagewise radiation can be carried out through a half-tone or continuous tone transparency. Other means of imagewise irradiation include exposure through a transmissive device, such as an absorptive filter, and exposure using a scanning laser, electron beam, or the like.

The index matching fluid layers 152 and 154, etc. are preferably hydrocarbons and most preferably are Isopar® L available from Chemcentral Corporation with offices at Southwestern Pennsylvania 19399 and Cargille A1.59 available from R.P. Cargille Laboratories, Inc. at Cedar Grove, N.J. 07009.

EXAMPLES

The advantageous properties of this invention can be observed by reference to the following examples which illustrate, but do not limit, the invention. In these Examples, parts and percents are by weight unless otherwise indicated. Terms or abbreviations used throughout the examples are defined the following glossary.

| GLOSSARY | |
|---|---|
| DE (%) | Diffraction efficiency expressed as a percent; DE (%) = $I_{dif}/I_o$ × 100, where $I_{dif}$ is the intensity of the diffracted beam of actinic radiation and $I_o$ is the intesity of the incident beam corrected for absorption in the film sample and for spurious reflections off the film sample |
| FC-430 | Fluorad ® FC-430; fluoroaliphatic polymeric esters; CAS 11114-17-3 3M Company, St. Paul, MN |
| Isopar ® L | An aliphatic hydrocarbon product; Exxon Company, Houston, TX |

-continued

GLOSSARY

| | |
|---|---|
| JAW | Cyclopentanone, 2,5-bis[2,3,6,7-tetrahydro-1H,5H-benzo[i,j]quinolizin-9-yl)methylene]- |
| MMT | 4-Methyl-4H-1,2,4-triazole-3-thiol; CAS 24854-43-1 |
| Mylar ® film | Polyethylene terephthalate film; registered trademark of E. I. du Pont de Nemours and Company, Wilmington, DE |
| NVC | N-Vinyl carbazole; 9-vinyl carbazole; CAS 1484-13-5 |
| Photomer ® 4039 | Phenol ethoxylate monoacrylate; CAS 56641-05-5; Henkel Process Chemical Company, Ambler, PA |
| PI-B | 4,5-diphenyl-1-[4,5-diphenyl-2-(2,3,5-trichloro-phenyl)-2H-imidazol- 2-yl]-2-(2,3,5-trichlorophenyl)-1H-imidazole |
| PVA | Poly(vinyl alcohol) |
| Sartomer 349 | Ethoxylated bisphenol A diacrylate; CAS 24447-78-7; Sartomer Company, West Chester, PA |
| SD-A | 3-[(1-ethyl-1,2,3,4-tetrahydro-6 quinolinyl)methylene]-2,3-dihydro-4H-1-benzopyran-4-one; CAS 75535-23-8 |
| SD-B | 2,4-bis[(3-ethyl-2(3H)-benzothiazolylidene) ethylidene]-8-methyl-8-azabicyclo[3.2.1]octan-3-one; CAS 154482-35-6 |
| SD-C | 1-ethyl-2-[[3-[(1-ethyl-1,3-dihydro-5-methoxy-3,3-dimethyl-2H-indol-2-ylidene)methyl]-2-hydroxy-4-oxo-2-cyclobuten-1-ylidene]methyl]-5-methoxy-3,3-dimethyl-3H-indolium hydroxide inner salt; CAS - none on computer files (STN International) |
| Spot# | Area/pixel/region (identified by number) of the HRF that is imaged in the examples of this specification |
| TFE | Tetrafluoroethylene |
| TMPTMA | Trimethylol propane trimethacrylate |
| VAc | Vinyl acetate |
| VOH | Vinyl alcohol |
| $(\lambda)_{max\ (nm)}$ | Wavelength of actinic radiation showing the maximum diffraction efficiency (DE (%)) from the transmission spectrum of the holographic mirror |

Example 1

This example demonstrates the ability to record high efficiency arrays of Red, Green, and Blue circular mirrors having a diameter of 20 microns at separate locations in a single holographic photopolymer layer in order to provide the high efficiency volume holographic reflector of this invention.

To prepare the holographic (photopolymer) recording film which is utilized in this example, a coating solution is prepared containing 66.0 weight % of tetrafluoroethylene/vinyl acetate (TFE/VAc) binder copolymer (containing 19.4 mole % TFE and 80.6 mole % vinyl acetate and having inherent viscosity=1.48 deciliters/gram measured at 30° C.), 21.0 weight % of Photomer® 4039, 6.0 weight % of NVC, 3.0 weight % of Sartomer 349, 3.0 weight % of PI-B, 1.0 weight % of MMT, 0.22 weight % of FC-430, 0.075 weight % of JAW, and 0.034 weight % of SD-C in 19:1 dichloromethane/methanol.

The solution is extrusion dye coated onto a 50 μm Mylar® base sheet at a speed of about 31 ft/min (15 cm/sec) using a web coater. The solvent is evaporated by passing the coated film through a three zone drier. The first zone is set at 120° F. (49° C.), the second is set at 140° F. (60° C.), and the third is set at 160° F. (71° C.). A coversheet of 23 micron Mylar® (polyethylene terephthalate film) is laminated to the coating as it exited the drier. Dry coating thickness of the holographic photopolymer is 20 μm between a 23 μm Mylar® cover sheet and 50 μm Mylar® base sheet.

The coversheet is removed from the photopolymer (holographic film) and the tacky photopolymer is laminated to a section of 100 mm×125 mm×3.2 mm float glass. Excess film is trimmed away so that the laminated film fits within the edges of the glass substrate. The base sheet is left in place during subsequent processing. We refer to the structure of base/holographic photopolymer and glass plate as the imaging plate. The film side of the imaging plate is coupled to an anti-reflection (AR) plate using Isopar® L (Exxon) to provide a good match of the refractive index of the film to the AR plate. On the opposite side of the imaging plate, a front-surface aluminum mirror is coup led to the surface using the same index matching fluid. Pressure is applied to the stack of plates to provide thin, even index matching fluid layers. The stack of plates is then mounted in a conventional plate holder mounted on an imaging stage and is allowed to settle for more than 30 seconds.

An argon ion laser with emissions at 458 nm, a diode-pumped, frequency-doubled YAG laser with emissions at 532 nm and a krypton ion laser with emissions at 64.7 nm are combined by appropriate dichroic mirrors in the conventional way to form a 3-color laser beam. This 3-color beam is passed through achromatic optics to form an expanded, collimated, 3-color beam. A shutter is installed to allow each color to be introduced separately (for the imaging of individual regions (spots or pixels) with one color wavelength of the three available in the 3-color beam). The imaging plate is rotated on the imaging stage such that the 3 color laser beam direction is perpendicular to the imaging stack.

The holographic film is exposed through a photomask (of the type illustrated in FIG. 4 except that the dot shape is circular rather than square) where the transmissive dots (i.e., dots which pass light, labeled P in FIG. 4) and the non-transmissive dots (i.e., dots which block light, labeled B in FIG. 4) in the mask are approximately 20 microns in diameter and represent approximately ⅓ and ⅔, respectively, of the total area of the photomask.

Holographic mirrors at each of three imaging wavelengths having the above dot dimensions are formed using the photomask, by exposing with a collimated single-color laser beam oriented perpendicular to the film plane and passing, in order, through the anti-reflection plate, Isopar® L layer, base sheet, holographic photopolyer, glass plate and Isopar®L layer and then reflecting back onto itself off the mirror.

The holographic film is exposed first with exposure wavelength 1 (red, wavelength=647 nm) with exposure energy 100 mJ/cm². With the holographic film fixed in place, the mask is then translated the distance of the dot diameter (approximately 20 microns) in the X direction as illustrated in FIG. 4 with respect to the holographic film. Then the holographic film is exposed a second time with exposure wavelength 2 (green, wavelength=532 nm) with exposure energy of 20 mJ/cm². Finally, with the holographic film fixed in place, the mask is then translated a second time the distance of the dot diameter (20 microns) in the X direction as illustrated in. FIG. 4 with respect to the holographic film. Then the holographic film is exposed a third time with exposure wavelength 3 (blue, wavelength=458 nm) with exposure energy of 10 mJ/cm².

After the above set of three exposures with red, green, and blue laser light is completed, the photomask, the AR plates, front surface mirror and Isopar® L layers are removed.

The imaging plate is overall exposed to ultraviolet and visible light from a Theimer-Strahler #5027 mercury-arc lamp (Exposure Systems Corp., Bridgeport, Conn.) mounted in a Douthitt DCOP-X exposure unit (Douthitt Corp., Detroit, Mich.) for 120 sec (about 150 mJ/cm²). The imaging plate is thermally processed by heating at 120° C. for 2 hours in a forced-air convection oven to enhance the holographic performance of the mirrors (gratings) contained within the overall hologram.

The resulting hologram, which is comprised of arrays of holograpic mirrors that separately each reflect red light, green light, or blue light and are circular dots of approximately 20 microns diameter, appears white to an observer viewing it in reflection in sunlight or normal roomlight. Furthermore, when the diffraction efficiency of a randomly chosen first volume holographic mirror in the resulting hologram is measured using red light, the diffraction efficiency is found to be >90%. Similarly, when the diffraction efficiency of a randomly chosen second volume holographic mirror in the resulting hologram is measured using green light, the diffraction efficiency is found to be >90%. Also, when the diffraction efficiency of a randomly chosen third volume holographic mirror in the resulting hologram is measured using blue light, the diffraction efficiency is found to be >90%. This hologram is termed a white holographic reflector.

What is claimed is:

1. In a reflective liquid crystal display apparatus including a liquid crystal display element having a layer of liquid crystals contained in a plurality of cells capable of providing a particular orientation for the liquid crystals therein, and including a holographic reflector adjacent the liquid crystal display element, the improvement comprising the holographic reflector being a holographic recording film layer containing a plurality of first pixel volumes and a plurality of second pixel volumes, each one of the first pixel volumes including a first volume holographic mirror that reflects only light with a first color wavelength band, each one of the second pixel volumes including a second volume holographic mirror that reflects only light with a second color wavelength band, the first and second pixel volumes being positioned in the recording film layer such that light passing through each liquid crystal cell is reflected from both a first pixel volume and a second pixel volume.

2. The apparatus of claim 1 wherein the recording film layer further contains a plurality of third pixel volumes, each one of the third pixel volumes including a third volume holographic mirror that reflects only light with a third color wavelength band, and the third pixel volumes are positioned in the recording film layer such that light passing through each liquid crystal cell is also reflected from a third pixel volume.

3. The apparatus of claim 2 wherein the first color wavelength band has a width of at least 5 nanometers and includes a wavelength of 612 nanometers, the second color wavelength band has a width of at least 5 nanometers and includes a wavelength of 545 nanometers, and the third color wavelength band has a width of at least 5 nanometers and includes a wavelength of 436 nanometers, whereby the reflector is adapted to operate as a white holographic reflector.

* * * * *